(12) United States Patent
Winther

(10) Patent No.: US 9,995,401 B2
(45) Date of Patent: Jun. 12, 2018

(54) VALVE WEDGE FOR A SLIDE VALVE

(71) Applicant: AVK Holding A/S, Galten (DK)

(72) Inventor: Thomas Winther, Horsens (DK)

(73) Assignee: AVK HOLDING A/S, Galten (DK)

( * ) Notice: Subject to any disclaimer, the term of this patent is extended or adjusted under 35 U.S.C. 154(b) by 157 days.

(21) Appl. No.: 14/651,511

(22) PCT Filed: Dec. 20, 2013

(86) PCT No.: PCT/EP2013/077609
§ 371 (c)(1),
(2) Date: Jun. 11, 2015

(87) PCT Pub. No.: WO2014/096322
PCT Pub. Date: Jun. 26, 2014

(65) Prior Publication Data
US 2015/0323084 A1  Nov. 12, 2015

(30) Foreign Application Priority Data

Dec. 21, 2012  (EP) .................................... 12198999

(51) Int. Cl.
*F16K 3/12* (2006.01)
*B29C 45/14* (2006.01)
(Continued)

(52) U.S. Cl.
CPC .......... *F16K 3/12* (2013.01); *B29C 45/14819* (2013.01); *B29C 2045/14868* (2013.01);
(Continued)

(58) Field of Classification Search
CPC ................. F16K 3/12; B29C 45/14819; B29C 2045/14868; B29K 2705/00; B29K 2021/00; B29L 2031/7506
(Continued)

(56) References Cited

U.S. PATENT DOCUMENTS

| 4,629,160 A | 12/1986 | David |
| 5,052,427 A * | 10/1991 | Butler ...................... F16J 15/14 |
| | | 137/15.11 |

FOREIGN PATENT DOCUMENTS

| CN | 85101818 A | 1/1987 |
| CN | 201687971 U | 12/2010 |

(Continued)

OTHER PUBLICATIONS

Machine translation of EP 0171693; translated via ESPACENET on Jun. 16, 2017.*

(Continued)

*Primary Examiner* — Kevin Murphy
*Assistant Examiner* — Patrick Williams
(74) *Attorney, Agent, or Firm* — Cantor Colburn LLP

(57) ABSTRACT

Valve wedge for a slide valve including a rough cast metal wedge core encapsulated in a soft seal encapsulation and having two guide members projecting transversely in opposite directions, each of the guide members including a sideways projecting rib of the rough cast wedge core and a prefabricated wear and corrosion-resistant slide shoe arranged thereon, each rib having laterally opposite lateral surfaces and each shoe including two opposite lateral walls with inner surfaces, each shoe being fixedly vulcanized to the respective one of the ribs by means of soft seal encapsulation present between the rough cast wedge core and the shoe where the outer lateral surfaces of the ribs are finished surfaces and the opposite inner surfaces of each of the slide shoes is laterally rigidly supported by the corresponding outer lateral surfaces of the respective one of the ribs so that each rib laterally rigidly supports the respective one of the slide shoes.

9 Claims, 6 Drawing Sheets

(51) Int. Cl.
    *B29K 705/00*     (2006.01)
    *B29L 31/00*     (2006.01)
    *B29K 21/00*     (2006.01)

(52) U.S. Cl.
    CPC ...... *B29K 2021/00* (2013.01); *B29K 2705/00* (2013.01); *B29L 2031/7506* (2013.01)

(58) Field of Classification Search
    USPC .................................. 251/329; 277/312–316
    See application file for complete search history.

(56) References Cited

FOREIGN PATENT DOCUMENTS

| | | |
|---|---|---|
| CN | 102124257 A | 7/2011 |
| CN | 102292580 A | 12/2011 |
| DE | 3345133 A1 | 9/1985 |
| EP | 0171693 A2 | 2/1986 |
| EP | 0926410 A2 | 6/1999 |
| JP | 2010236586 | 10/2010 |
| WO | 2004038266 A1 | 5/2004 |

OTHER PUBLICATIONS

International Search Report for corresponding application PCT/EP2013/077609 filed Dec. 20, 2012; dated Jan. 28, 2014.

\* cited by examiner

VALVE WEDGE FOR A SLIDE VALVE

TECHNICAL FIELD

The present invention relates to the technical field of slide valves and in particular to a valve wedge for a slide valve comprising a rough cast metal wedge for a slide valve comprising a rough cast metal wedge core encapsulated in, i.e. coated with, a soft seal encapsulation, i.e. a soft coating, and having two guide members projecting transversely in opposite directions and being adapted to engage respective one of guide grooves provided inside a housing of the slide valve so as to take up an axial pressure exerted on the valve wedge during operation, each of said guide members comprising a sideways projecting rib of said rough cast wedge core and a prefabricated wear and corrosion-resistant slide shoe arranged thereon, each rib comprising laterally opposite lateral surfaces and an end-face and each shoe comprising two opposite lateral walls with inner surfaces and outer surfaces adapted for interacting with corresponding slide surfaces of the guide grooves and each shoe being fixedly connected with or vulcanized to the respective one of the ribs by means of soft seal encapsulation present between the rough cast wedge core and the shoe.

Additionally, the present invention relates to a slide valve comprising a valve wedge according to the invention and to a method for manufacturing a valve wedge according to the invention.

BACKGROUND

Slide valves may be used in pipeline systems for distributing and/or handling fluid such as water, sewages, natural gas or similar liquid or gaseous media. A slide valve comprises a housing defining a passage way for the fluid to flow in an axial direction to the housing. The passage may be closed and open by sliding the valve wedge in a direction transverse to the axial direction. Typically, the plane of the sliding movement of the valve wedge is essentially perpendicular to the axial direction. The motion of the valve wedge is actuated by actuation means. The actuation means may comprise a threaded valve stem configured to act upon a valve nut to produce a linear translational movement of the sliding of the slide wedge into or out of the passage way of the housing.

Under operation, the valve wedge is subjected to considerable pressure in the axial direction. In order to take up these axial pressures sliding bearings comprising the guide members projecting into the corresponding guide grooves in the valve housing are provided. The guide grooves are shaped complimentary to the shape of the guide members so as to provide guidance at least in axial direction.

In a slide valve in a soft sealing type, a sealing is provided by the soft sealing material, typically a rubber material, engaging a valve seat, which may be a dedicated valve seal element or simply a wall of the valve housing. The material of the core of the valve wedge is typically cast iron, which is prone to degradation/corrosion when exposed to a fluid passing through the valve. Therefore, the soft sealing encapsulation is provided for purposes of improving corrosion protection of the core. The ribs of the core may also be covered with the soft sealing material. However, the problem of such a solution is that the soft sealing material is typically not wear-resistant with respect to a sliding motion. Further, typical soft sealing material has a high friction coefficient with respect to most surfaces. This problem may be solved by using slide shoes arranged on the guide ribs, wherein the slide shoes are preferably made of a wear-resistant and corrosion-resistant material providing a low friction sliding interface with a sliding surface of a cooperating guide groove.

EP0171693 discloses a slide valve with a valve wedge comprising guide shoes that are attached to the valve wedge core and molded together with a rubber encapsulation of the valve wedge. The problem with this solution is that the slide shoes, which are supported by a relatively thick, soft layer of soft seal material, prevent a precise control over the valve member movement as the slide shoes may flex laterally relative to the core, whereby the life of the valve wedge may be decreased.

EP0926410 discloses a slide valve wedge, wherein a slide shoe is attached to the ribs of the core after the soft sealing encapsulation has been molded onto the core. The problem with this solution is that the slide shoes supported by the soft layer prevent a precise control over the valve wedge movement as the guide shoes may flex laterally. In particular under large axial pressure on the valve wedge such flexing on the shoes may result in an excessive wear of the valve actuation mechanism as well as the sealing surfaces. Furthermore, when applying a soft seal encapsulation to a valve wedge, the valve wedge core is typically supported by centering pins during molding in order to center the core in the mold. These centering pins leave openings in the soft seal encapsulation, thus requiring a subsequent sealing step for these openings.

DE3345133 discloses a valve wedge for a slide valve comprising a metal core encapsulated in a rubber elastic material. The metal core is provided with lateral guiding grooves in each of which a U-shaped sliding shoe of plastic material is arranged so that a gap or hollow space is formed between the sliding shoes and the guiding grooves. The gap or hollow space is filled with molding mass of rubber elastic material during molding of the encapsulation onto the metal core. The sliding shoes are supported by the soft rubber elastic material preventing a precise control over the valve wedge movement, especially at the large axial pressures on the valve wedge.

BRIEF SUMMARY

The invention overcomes at least some of the above-mentioned drawbacks and especially to provide a valve wedge that may be precisely guided relative to the housing of the slide valve and where the coating or encapsulation of the valve core may be controlled without using centering pins that decreases the corrosion resistance of the valve wedge.

The valve wedge according to the invention is characterized in that the opposite outer lateral surfaces of the ribs are finished surfaces and that the opposite inner surfaces of each of the slide shoes is laterally rigidly supported by the corresponding outer lateral surfaces of the respective one of said ribs so that each rib laterally rigidly supports the respective one of the slide shoes.

In other words, each opposite lateral face of each rib is rigidly connected with and thereby rigidly supports the corresponding inner surfaces of the lateral walls of the respective one of the slide shoes, whereby the slide shoes are laterally rigidly supported by the ribs so that the shoes are not laterally moveable or may flex laterally relative to the core.

The prefabricated slide shoes provided on the ribs facilitates manufacturing of the valve wedge by positioning and centering the valve core in the mold during molding of the soft seal encapsulation onto the core.

By the finishing, the lateral outer surfaces of the ribs are subjected to additional processing after the core has been formed by casting. The finishing can be carried out by a mass-reducing process, i.e. where material is removed by machining. Another possibility is to carry out the finishing by means of a mass-conserving process such as stamping, where material is subjected to deformation. Finishing of the lateral surfaces improves the tolerance of the dimension between the opposite lateral surfaces of the ribs of the core so as to improve the tolerance of the molding of the encapsulation and thereby improve the tolerance of the valve wedge.

Further, the rigid support of the slide shoes directly on the respective ribs prevents any lateral movement of the core relative to the shoes and thereby provides an exact guidance of the slide surfaces of the shoe in the corresponding grooves in the housing. Due to the above rigid connection, encapsulation material present between the shoes and the core are not subjected to fatigue, whereby the life of the wedge is improved.

According to an embodiment of the valve wedge, the slide shoes are made of a material with a relatively larger elastic modulus compared to that of the material of the soft seal encapsulation.

By selection a slide shoe material that is relatively stiff, as compared to the soft seal encapsulation material, the stability of the slide shoe is improved and precision of the slide shoe operation increased. This is particularly advantageous when moving the valve wedge under a significant one-sided pressure load due to the pressure drop across the valve. Thereby, an enhanced durability and reliability of the valve wedge and the slide valve comprising such a valve wedge is achieved.

According to an embodiment, the slide shoes are essentially U-shaped in a cross-sectional view and provided with a bottom face on a bottom wall extending between the lateral walls.

The material of the slide shoes can be PA6.6 or POM. However, other plastic materials may be used having good sliding properties, high wear resistance and heat resistance. Preferably, the slide shoes are formed by injecting molding.

The material of the encapsulation can be EPDM for fluid and NBR for gases. However, other properties may also be used.

The slide shoes may be trough-shaped and provided with opposite end walls with inner surfaces extending between the lateral walls. Thereby, the slide shoes circumferentially surround the respective ribs.

According to an embodiment, the opposite inner surfaces of the shoes abut the corresponding lateral outer surfaces of the respective one of the ribs.

Due to the very high injection pressure during injection molding of the rubber coating onto the core, a very thin layer of rubber, i.e. rubber film, may be present between the outer lateral surfaces of the ribs of the core and the corresponding inner surfaces of the respective slide shoes. However, such a thin film is to be considered equivalent with a direct contact between the surfaces in question and thereby provide the desired rigid connection between the lateral surfaces of the ribs and the corresponding inner surfaces of the shoes.

The shoe can be provided with a limited weakened area, especially a small round area in the bottom wall of the shoe, the weakening being such that during molding of the encapsulation by injection of encapsulation material in the mold, the weakened area is broken due to the high injection pressure, whereby a vent opening is formed.

The vent opening allows air trapped between the rib of the core and the shoe to be vented through the formed opening during molding so as to obtain complete encapsulation behind the shoe. Further, the weakened area allows for complete priming of the inner surface of the shoe before molding and prevents that primer is applied to the outer surface of the shoe.

The tolerance of the dimension or distances between the opposite lateral faces of the ribs of the core is less than +/−0.4 mm, preferably less than +/−0.3 mm, especially less than +/−0.2 mm.

The slide shoes may be attached to the respective one of the ribs by snap fit-engagement.

According to a further embodiment, the lateral surfaces of the ribs are laterally protruding surfaces, protruding relatively to the adjacent lateral portions of the rib, an edge being formed between the protruding surface and adjacent portion.

The inner surface of each of the opposite lateral walls of the slide shoes may be provided with a ledge at the rim of the slide shoe opposite the bottom wall, said ledge being in engagement behind the above-mentioned edge.

The outer surfaces of the slide shoes may be chamfered or rounded between the lateral walls and the bottom wall.

Thereby, the positioning of the core in the mold is facilitated.

Additionally, the outer surface of the slide shoes may be chamfered or rounded between the end walls and the bottom wall.

Thereby, the arrangement of the core in the mold is further facilitated.

The ribs core is preferably made of cast iron, especially SG-iron.

The present invention further relates to slide valve comprising a valve wedge according to the invention.

Additionally, the present invention relates to a method for manufacturing of a valve wedge according to the invention comprising the following steps:

A: providing a rough cast core with sideways projecting ribs at opposite sides thereof, each rib having opposite lateral faces and an end face, B: subjecting each of the opposite surfaces of each rib for a finishing process so as to improve the tolerance of the spacing (S) between the lateral surfaces of the ribs, C: providing two slide shoes being essentially U-shaped as seen in a cross-sectional view and having two opposite lateral walls with respective inner surfaces and a bottom wall with an inner surface, the inner surfaces of the lateral walls of the slide shoes being spaced (L) so as to tightly engage the finished surfaces of the ribs, D: arrange a shoe on each rib so that it is laterally rigidly connected to the respective rib, E: providing a mold for molding the rubber coating onto the core, the mold having inner surface areas adapted to tightly abut the lateral outer surfaces of the lateral side walls of the shoes and thereby exactly position the shoes and thereby the core laterally, F: injecting rubber into the mold in order to provide the coating thereof, whereby rubber is also provided in areas between the inner surface of the shoes and outer surfaces of the ribs, whereby the slide shoes are firmly and rigidly connected to the core by vulcanization of the rubber, and G: remove the coated wedge from the mold.

According to an embodiment of the method according to the invention, the outer lateral surfaces of the ribs are finished by stamping.

The stamping may be provided so that the tolerance of the distance between the lateral surfaces of the ribs is less than +/−0.4 mm, preferably less than +/−0.3 mm, and especially less than +/−0.2 mm.

The finishing of the outer lateral surfaces may, as mentioned previously, also be carried out by machining, i.e. by removing material.

According to a further embodiment prior to step D, the inner surfaces of the shoes are primed with an adhesive primer.

Thereby, an improved connection between the shoes and the coating is provided.

Further, prior to step D, the outer surface of the core may be primed with an adhesive primer.

Thereby, an improved connection between the core and the rubber coating is provided.

According to a further embodiment, prior to step D, the end faces of the ribs are finished so as to provide a predetermined dimension between the finished end faces.

The tolerance between the predetermined dimension between the finished end surfaces of the core is preferably a narrow tolerance within fractional millimeters depending on the dimension such as less than +/−0.4 mm, less than +/−0.3 mm or less than +/−0.2 mm.

The finished end surfaces may be provided by punching, whereby the punching advantageously is carried out at the same time as the lateral faces of the ribs are finished by stamping. However, it should be mentioned that both the finishing of the lateral faces and the end faces of the ribs may be carried out by other processes than the mentioned processes such as by machining removing material.

Advantageously, the core is provided with a through-going axial bore extending from an upper to a lower end of the core. A brass or bronze bushing having an upper and a lower surface is fixedly connected in the bore at an upper end thereof. The bushing may be fixed to the upper end of the bore by a press fit provided by expanding the bushing by means of a drift so that outer surface portions of the bushing are pressed into recesses between protruding portions of the inner surfaces of the bore.

Further, a predetermined longitudinal spacing between the lower surface and the bushing and the lower surface of the core may advantageously be provided.

This can be done by machining the lower surface of the bushing to the desired tolerance on the predetermined spacing between the lower surface of the bushing and the lower surface of the core.

Alternatively, a press-tool may be used comprising a lower support for supporting the lower end of the core and a tubular support extending upwardly from the lower support and ending in an upper support face for supporting the lower surface of the bushing during the expansion thereof. Thereby, the spacing between the lower support of the tool and the upper support face of the tubular support defines the predetermined spacing between the lower surface of the bushing and the lower surface of the core.

Tolerance of the above predetermined spacing may be a narrow tolerance within fractional millimeters depending on the spacing such as less than +/−0.4 mm, less than +/−0.3 mm, preferably less than +/−0.2 mm.

By means of the above predetermined longitudinal spacing, it is possible to obtain a precise longitudinal position of the core in the mold. Together with the mentioned precise and rigid support of the core in the mold by means of the shoes, it is possible to obtain a very precise position of the core in the mold and thereby obtain the desired thickness of the coating on the core over the entire extend thereof.

BRIEF DESCRIPTION OF THE DRAWINGS

In the following, the invention is further explained by reference to the drawings, in which.

DETAILED DESCRIPTION

Figure 1:
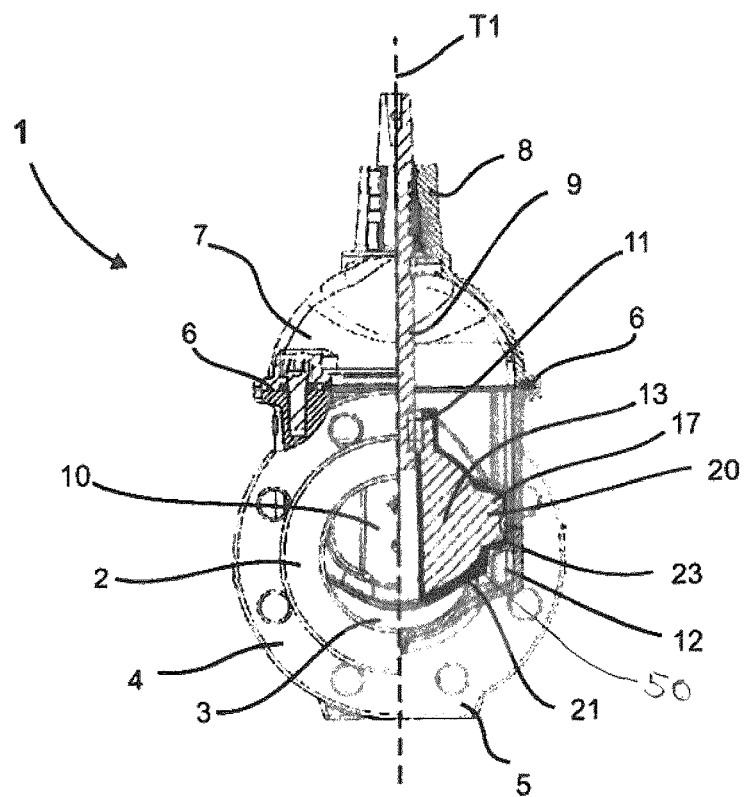
FIG. 1 discloses a front elevational view of a slide valve partially cut away.
Figure 2:
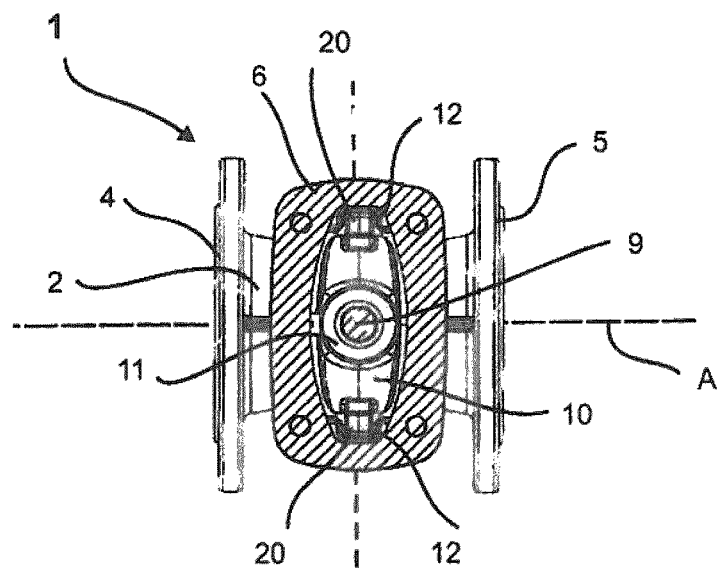
FIG. 2 discloses a top elevational view of the slide valve of FIG. 1 with a valve bonnet removed, FIG. 3 discloses a perspective view of a valve core of a valve wedge according to the invention, FIG. 4 discloses a perspective view of a slide shoe for a valve wedge according to the invention, FIG. 5 discloses a perspective view of a soft seal encapsulated valve wedge according to the invention, FIG. 6 discloses a longitudinal cross-sectional view of a valve wedge according to the invention, FIG. 7 discloses a sectional view along the line VII-VII in FIG. 6, FIG. 8 discloses a sectional view of a press-tool for mounting a wedge nut in a wedge core, FIG. 9 discloses a cross-sectional view through a press- and punch-tool for finishing latter surfaces and end faces of the wedge core, FIG. 10 discloses diagrammatically a longitudinal sectional view through a mold for molding a rubber elastic encapsulation onto the core, FIG. 11 discloses a lower mold part of the mold shown in FIG. 10 as seen from above, FIG. 12 discloses the lower mold part seen in a sectional view with a wedge core arranged on a mantel of the middle part of the mold.

FIGS. 1 and 2 discloses a slide valve 1 comprising a housing 2 defining a passage way 3 for a fluid to flow through the housing 2 in an axial direction A thereof. The housing 2 has flanges 4, 5 for installing the valve in a pipeline system (not shown) for liquid or gaseous media. The housing 2 further comprises a top flange 6 for attaching a valve bonnet 7 with a valve box 8 through which a stem 9 passes from the outside of the valve 1 to the inside thereof. Rotating the stem around its longitudinal axis actuates a valve wedge 10 by engaging a valve wedge nut 11 of the valve wedge 10 so that the valve wedge 10 is moved up and down relative to the passage way. The movement of the valve wedge 10 is guided by guiding means comprising guide grooves 12 in the housing interacting with guide members 20 of the wedge to form a sliding bearing for a linear translational movement of the valve wedge 10 in a first direction T1 being the axial direction of the wedge and the stem. The guide grooves are essential parallel to the first direction T1 and are arranged on the inside of the housing 2 and lateral of the passage way 3. Two guide members 20 are provided on the periphery of the valve wedge 10 projecting in an outward direction from opposite sides thereof.

The valve wedge 10 comprises a valve wedge core 13 made of cast iron encapsulated by a soft sealing material 50 such as rubber. The core 13 comprises sideways projecting ribs 17. A trough-shaped slide shoe 23 is arranged on each of the ribs 17 as will be described in more detail below. The projecting ribs with the slide shoes 23 arranged thereon comprise together with adjacent encapsulation the guide members 20.

Figure 3:
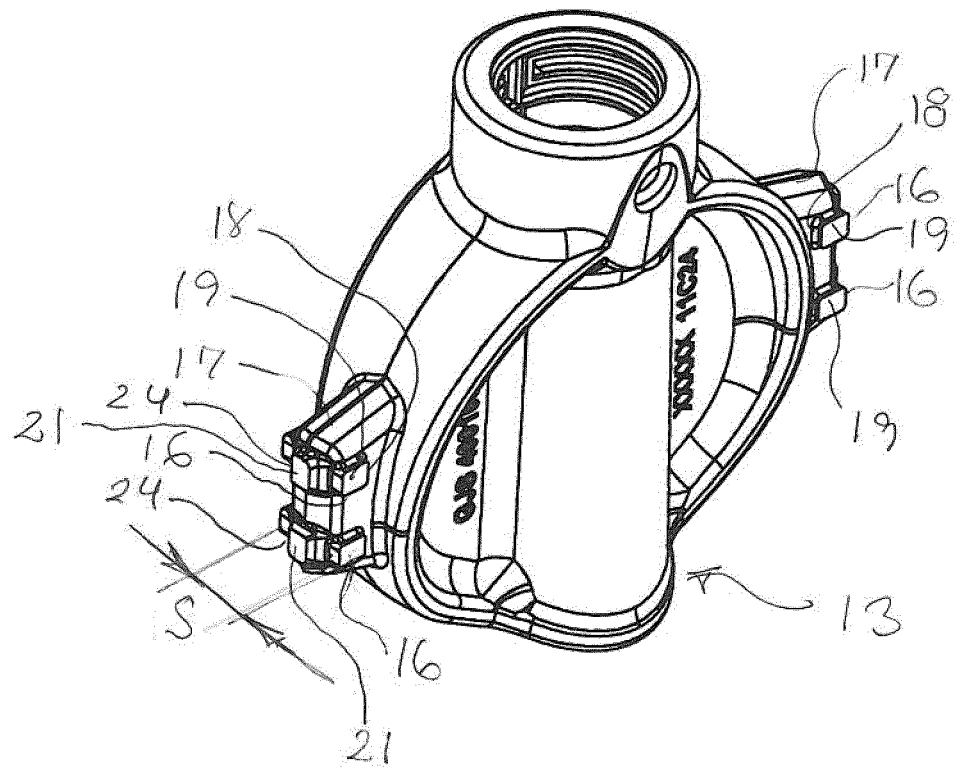

As it more clearly appear from FIG. 3, each projecting rib 17 is on each lateral side thereof provided with two mutually spaced projections 16 projecting from adjacent areas of the respective rib. An edge 18 being formed between each projection 16 and the adjacent lateral portions of the ribs. The lateral outer surfaces of each projection 16 are finished lateral surfaces 19. Opposite finished surfaces being finished so as to improve the tolerance of the spacing S between the opposite lateral finished surfaces. Further, it should be mentioned that the finished surfaces on the same side of the rib are lying in a common plane.

Figure 4:
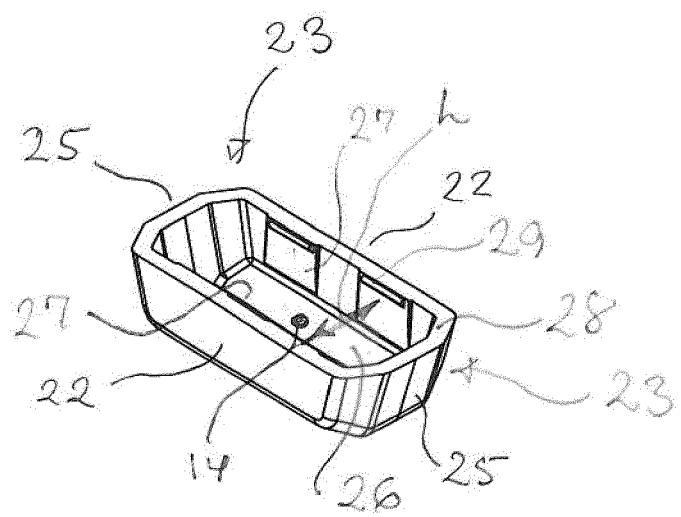

Additionally, each of the opposite ends of the ribs is provided with two end projections 24 with finished end faces 21. The end faces 21 of each rib being arranged in a common plane. The finished lateral faces 19 and finished end faces 21 of the ribs 17 are intended to cooperate with corresponding faces of the respective trough-shaped slide shoes 23. The slide shoes are prefabricated shoes and preferably injection molded of a plastic material having high wear-resistance. An embodiment of a trough-shaped slide shoe 23 is shown in FIG. 4. Each shoe 23 comprises opposite lateral side walls 22 and opposite end walls 25 and a bottom wall 26. Opposite inner surfaces 27 of the side walls 22 is spaced L corresponding to the spacing S between lateral finished surfaces of the ribs. At the upper rim 28 of the shoe a ledge 29 is provided. The shoes are arranged on the ribs by means of a friction snap fit engagement, whereby the ledges 29 are engaged behind the edges 18 of the projections 16 of the ribs and the opposite inner surfaces 27 of the shoe 23 engages the respective lateral finished surfaces 19 of the ribs as it more clearly appears from FIGS. 6 and 7.

Each shoe 23 is provided with a limited weakened area 14, especially a small round area in the bottom wall 26. During injection of the rubber into the mold, the weakened area 14 is broken due to the high injection pressure, whereby a vent opening is formed allowing air trapped between the rib 17 of the core and the shoe 23 to be vented through the formed vent opening. The weakened area 14 allows for a complete priming of the inner surface of the shoe 23 before molding and venting of entrapped air during molding so as to obtain complete encapsulation behind the shoe 23.

Figure 5:
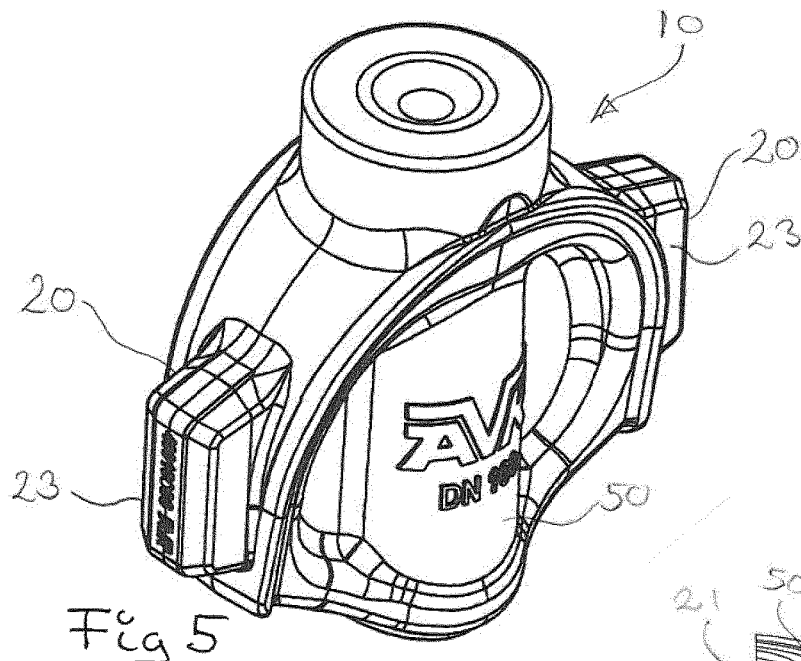
Figure 7:
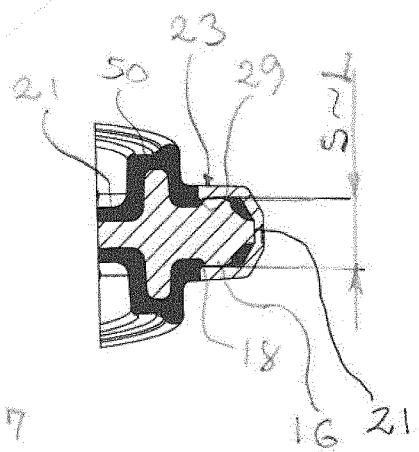
Figure 6:
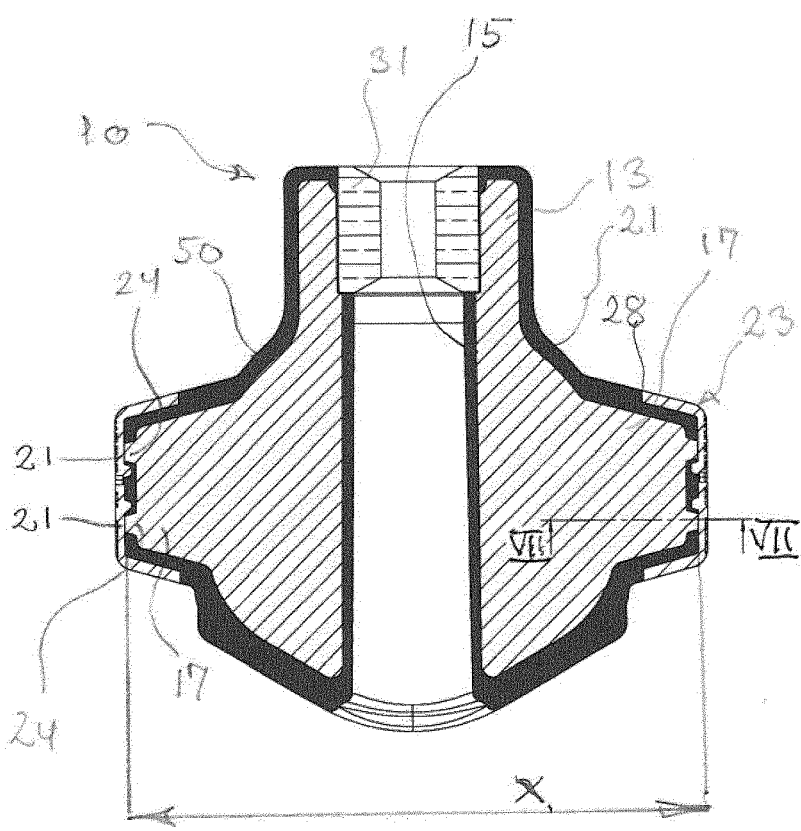

As it can be seen from FIG. 5, FIG. 6 and FIG. 7, the encapsulating rubber material 50 covers the outer surface of the core 13. Additionally, encapsulating material 50 is present between the inner surface of the shoes 23 and the outer surface of the ribs 17. The encapsulating material extends onto the rim of the shoes so that the core is completely enclosed by the encapsulation 50 and the shoes 23. The engagement between the inner surfaces of the shoes and the finished lateral surfaces 19 of the ribs 17 provide for a rigid support of the slide shoes so that the slide shoes are not moveable or able to flex laterally relative to the core of the wedge. Thereby, an excellent and precise guidance of the wedge is provided.

The end projections 24 of the ribs have finished end surfaces 21. The end surfaces 21 of the ribs are mutually spaced at distance X. The tolerance of the distance between the opposite lateral faces of the ribs of the core and the mutual spacing between the opposite end faces 30 is preferably less than +/−0.3 mm, especially less than +/−0.2 mm in order to obtain the desired precision of the encapsulation 50 of the wedge and the wedge in general.

Further, and as it appears from FIG. 6, the wedge is provided with a through-going axial bore 15 extending from an upper to a lower end of the wedge. A bushing 31 of brass or bronze is fixed to an upper end of the bore. In the finished wedge the bushing is provided with an inner thread adapted to cooperate with an outer thread of the stem 9. Further, as seen in FIGS. 4, 6 and 7 the outer surfaces of the shoes are chambered between the lateral side walls 22 and the bottom wall 26 and rounded between the bottom wall 26 and the end walls 25.

Figure 8:
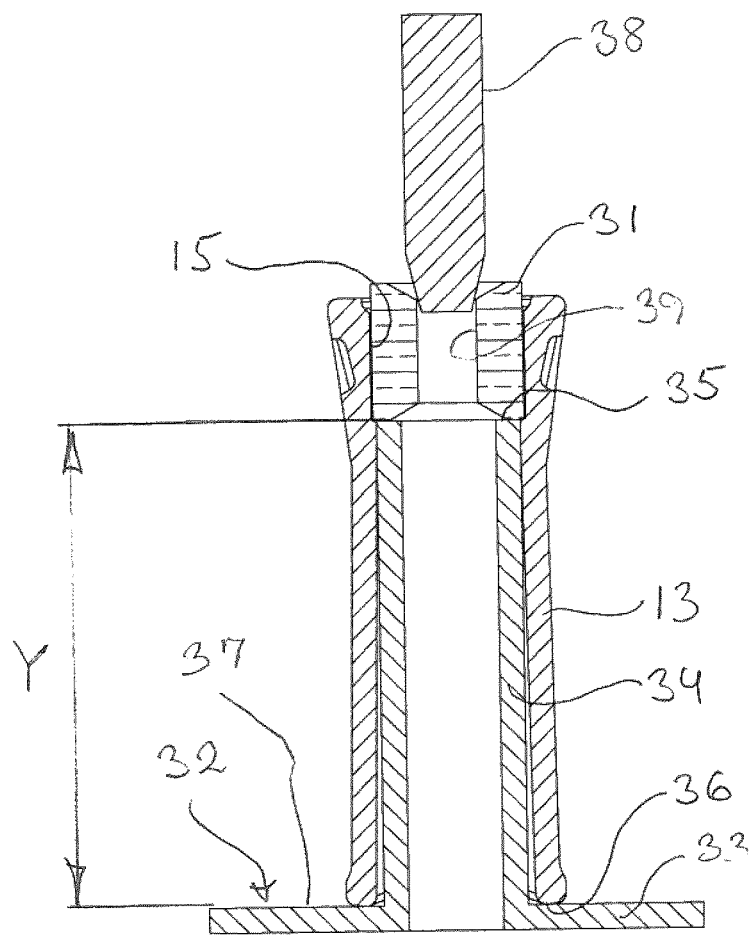
Figure 9:
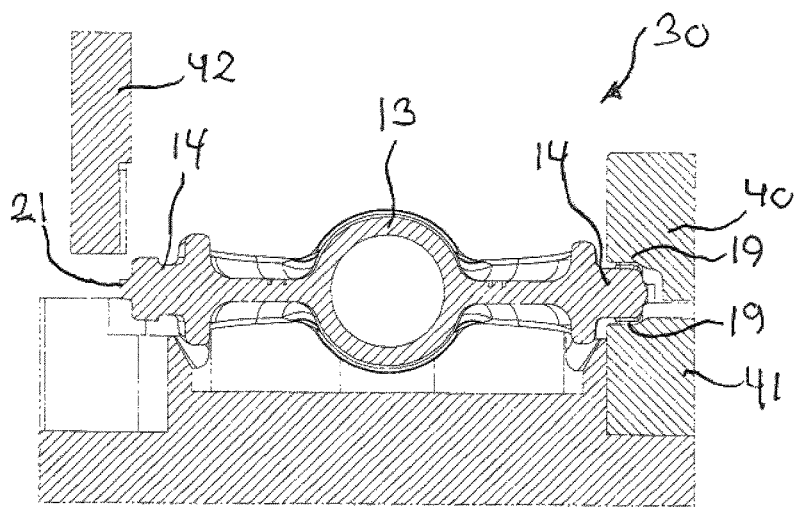

The valve wedge can be manufactured by a method comprising the following steps:

providing a rough cast core, especially a core made of cast iron, especially cast SG iron with sideways projecting ribs 17 at opposite sides thereof, each rib having opposite lateral faces and an end face, subjecting the opposite surfaces of each rib 17 to a finishing process so as to improve the tolerance of the spacing between the lateral surfaces 19 of the ribs. Further, the end surfaces of the opposite ribs may be finished so as to provide improved tolerance of the spacing between the finished end surfaces 21 of the ribs 17. The finishing of the lateral faces of the ribs and the end faces of the ribs may be carried out by means of combined punching and stamping tool 30 as shown in FIG. 9. The tool comprises opposite stamping parts 40, 41 stamping the opposite projection means 16 of the ribs 14 of the core 13 so as to provide the desired tolerance of the spacing between the finished lateral surfaces 19 of the projections of the ribs. Additionally, the tool comprises a punching part 42 punching, i.e. cutting, the end faces of the ribs so as to provide finished end surfaces 21 and thereby the desired spacing X between the said finished end surface of the ribs 14.

providing a bushing 31 of bronze having a bore 39 and expanding the bushing 31 radially at the upper end of the through-going axial bore using a press-tool 32 as shown in FIG. 8. The shown press-tool comprises a lower support 33 for supporting a lower end of the core and a tubular support 34 extending upwardly from the lower support 33 and ending in an upper support face 35.

The lower surface 36 of the bushing is arranged on the upper support face 35, whereby the spacing Y between the upper support face 35 and the lower support face of the press-tool corresponds to the desired predetermined spacing between the lower surface of the bushing and the lower surface of the core.

Thereafter, a conical mantel 38 is moved into the bore 39 of the bushing, whereby the bushing is expanded and the outer surface thereof pressed into recesses between protruding portions of the inner surface of the bore is of the core 13 so as to fixedly attach the bushing to the core.

By means of the above predetermined longitudinal spacing Y between the lower surface of the bushing and the lower surface of the core, it is possible to obtain a precise longitudinal position of the core in the mold.

Then two prefabricated injection molded slide shoes 23 being essentially trough-shaped are provided. Each slide shoe 23 has two opposite lateral side walls 22 with the respective inner surfaces 27, a bottom wall 26 and two opposite end walls 25. The inner surfaces 27 of the lateral side walls are spaced so as to tightly engage the finished surfaces of the ribs 19 when the shoes 23 are arranged on the ribs. The inner surfaces of the shoes 23 are provided with an adhesive primer up to and including the rim 28 of the shoes 23 in order to thereby improve the connection between the shoes and the coating, which is to be injected in a tool at a later stage.

Correspondingly, the outer surface of the core 13 is primed with an adhesive primer in order to improve the adhesive between the core 13 and the injected rubber material.

Thereafter, a slide shoe 23 is arranged on each rib 14 by a snap action and thereby laterally rigidly connected to the respective rib.

A mold for molding the rubber coating onto the core is provided, the mold having an inner surface area adapted to tightly abut the lateral outer surfaces of the shoes and thereby exactly position the shoes and therefore the core laterally.

Figure 10:
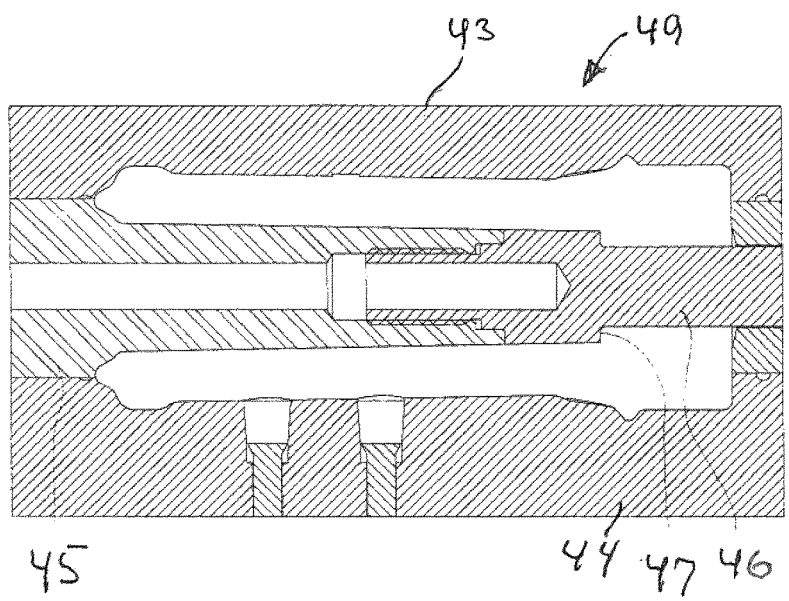
Figure 11:
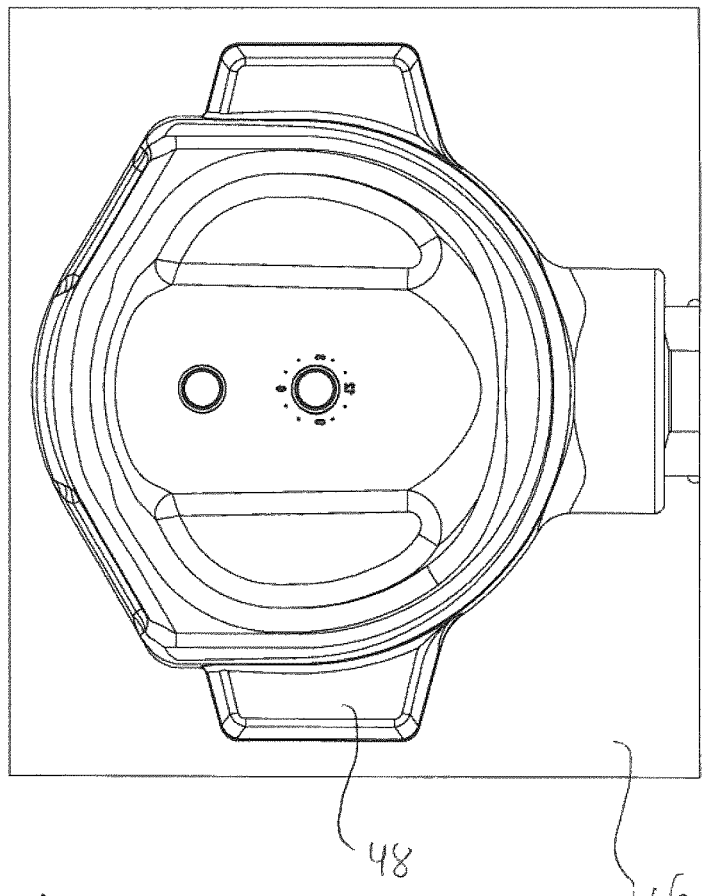
Figure 12:
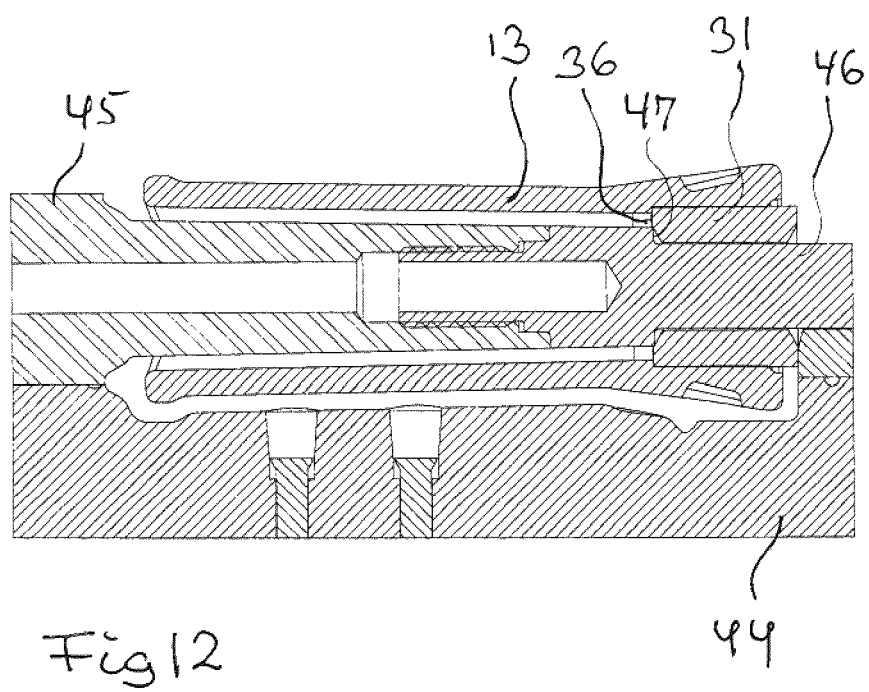

A mold 49 for molding the coating onto the core is shown in FIGS. 10-12. The mold comprises an upper mold part 43, a lower mold part 44 and a middle mold part 45. As seen in FIG. 10, the middle mold part comprises a mantel 46 adapted to be received in the bore of the bushing and thereby assist in positioning the core in the mold cavity. The mantel 46 is provided with a shoulder 47 adapted to engage the lower surface of the bushing, which is forced against said shoulder, whereby a precise longitudinal position of the core is provided. The lower mold part is as seen in FIG. 11 provided with inner surface areas 48 forming portion of the cavity and being adapted to tightly abut the corresponding outer surface of the lateral side wall of the respective shoe. Correspondingly, the upper mold part is provided with inner surface areas (not shown) forming a portion of the mold cavity and being adapted to tightly abut the other lateral surface of the shoe in question, whereby the said inner surface areas 48 exactly position the shoe and thereby the core laterally. Together with the above-mentioned precise longitudinal position of the core provided by means of the mantel 46, a very precise positioning of the core in the mold is obtained, whereby the desired thickness of the coating on the core is obtained over the entire extend thereof when coating material is injected into the cavity of the mold in the next step. In this next step, rubber is injected into the mold in order to provide the coating thereof, whereby rubber is also provided in areas between the inner surface of the shoes 23 and the outer surface of the ribs, whereby the slide shoes 23 are firmly and rigidly connected to the core by vulcanization of the rubber.

After the vulcanization of the rubber has taken place, the coated wedge is removed from the mold and placed in a valve housing, an inner thread being provided in the bushing prior to molding of the coating onto the core.

The invention claimed is:

1. A valve wedge for a slide valve comprising:
a rough cast metal wedge core encapsulated in a soft seal encapsulation, and two guide members projecting transversely in opposite directions and being adapted to engage respective one of guide grooves provided inside a housing of the slide valve so as to take up an axial pressure exerted on the valve wedge during operation, wherein each of said guide members comprises a sideways projecting rib of said rough cast wedge core and a prefabricated wear and corrosion-resistant slide shoe arranged thereon,
wherein each rib comprises laterally opposite first and second lateral surfaces and an end-face and each shoe comprising two opposite lateral walls with inner surfaces and outer surfaces adapted for interacting with corresponding slide surfaces of the guide grooves and each shoe being fixedly connected with or vulcanized to the respective one of the ribs by means of soft seal encapsulation present between the rough cast wedge core and the shoe,
wherein the respective first and second lateral surfaces of the ribs are finished surfaces and the opposite inner surfaces of each of the slide shoes is laterally rigidly supported by the corresponding first and second lateral surfaces of the respective one of said ribs so that each rib laterally rigidly supports the respective one of said slide shoes,
wherein each rib comprises first and second mutually spaced projections, each projecting from one of the lateral surfaces of each rib and wherein an edge is formed at the intersection of each projection and corresponding, and wherein each rib comprises two end projections provided on the end-face.

2. The valve wedge according to claim 1, wherein the slide shoes are made of a material with a relatively larger elastic modulus compared to that of the material of the soft seal encapsulation.

3. The valve wedge according to claim 1, wherein the slide shoes are essentially U-shaped in a cross-sectional view and provided with a bottom face on a bottom wall extending between the lateral walls.

4. The valve wedge according to claim 1, wherein the slide shoes are trough-shaped and provided with opposite end walls with inner surfaces extending between the lateral walls.

5. The valve wedge according to claim 1, wherein the opposite inner surfaces of the shoes abut the corresponding first and second lateral surfaces of each rib.

6. The valve wedge according to claim 1, wherein the shoe is provided with a limited weakened area such that during moulding of the encapsulation by injection of encapsulation the weakened area is broken due to the injection pressure, whereby a vent opening is formed.

7. The valve wedge according to claim 1, wherein tolerance of a dimension S between the opposite lateral surfaces of the ribs of the core is less than +/−0.4 mm.

8. The valve wedge according to claim 1, wherein the slide shoes are attached to the respective one of the ribs by snap-fit engagement.

9. The valve wedge according to claim 3, wherein the outer surfaces of the slide shoes are chamfered or rounded between the lateral walls and the bottom wall.

* * * * *